(12) United States Patent
Steinetz

(10) Patent No.: US 7,086,648 B1
(45) Date of Patent: Aug. 8, 2006

(54) ACOUSTIC SEAL

(75) Inventor: Bruce M. Steinetz, Westlake, OH (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 10/652,088

(22) Filed: Aug. 22, 2003

(51) Int. Cl.
*F16J 15/44* (2006.01)

(52) U.S. Cl. .................... 277/409; 277/411; 277/412; 277/423; 277/431

(58) Field of Classification Search ............... 277/409, 277/411, 412, 423, 431
See application file for complete search history.

(56) References Cited

U.S. PATENT DOCUMENTS

| | | | |
|---|---|---|---|
| 4,189,156 A | 2/1980 | Geary, Jr. et al. | |
| 4,393,708 A | 7/1983 | Barmatz et al. | |
| 4,948,497 A | 8/1990 | Ohkawa | |
| 5,319,938 A | 6/1994 | Lucas | |
| 5,419,877 A | 5/1995 | Goforth et al. | |
| 5,515,684 A | 5/1996 | Lucas et al. | |
| 5,794,942 A | 8/1998 | Vance et al. | |
| 5,831,166 A | 11/1998 | Kozuka et al. | |
| 5,994,854 A | 11/1999 | Lawrenson et al. | |
| 6,146,267 A | 11/2000 | Beudon et al. | |
| 6,163,077 A | 12/2000 | Lucas | |
| 6,216,538 B1 | 4/2001 | Yasuda et al. | |
| 6,230,420 B1 | 5/2001 | Lawrenson et al. | |

OTHER PUBLICATIONS

Xiaofan Li, et al., Daniels and Steinetz, "Nonlinear Resonant Oscillations of Gas in Optimized Acoustical Resonators and the Effect of Central Blockage," 41st Aerospace Sciences Meeting and Exhibit, American Institute of Aeronautics and Astronautics, Reno, Nevada, USA, Jan. 6-9, 2003; National Aeronatucis and Space Administration, Feb., 2003.

*Primary Examiner*—Vishal Patel
(74) *Attorney, Agent, or Firm*—Kent N. Stone; Ralph E. Jocke (57) ABSTRACT

The invention relates to a sealing device having an acoustic resonator. The acoustic resonator is adapted to create acoustic waveforms to generate a sealing pressure barrier blocking fluid flow from a high pressure area to a lower pressure area. The sealing device permits noncontacting sealing operation. The sealing device may include a resonant-macrosonic-synthesis (RMS) resonator.

16 Claims, 9 Drawing Sheets

ACOUSTIC SEAL

TECHNICAL FIELD

This invention relates in general to acoustic wave principles. More particularly, this invention relates to an acoustic seal device that exploits acoustic wave principles to generate a pressure barrier to prevent/control fluid leakage from a relatively high pressure area.

BACKGROUND OF THE INVENTION

Sealing devices and methods are used to reduce or prevent the movement of fluids between areas in various types of apparatus and systems. Traditional sealing devices generally exhibit net leakage fluid flow from a high pressure area to a low pressure area. This leakage generally results in a performance penalty to the system. Such sealing devices often rely on a contacting relationship between relatively movable surfaces and sealing elements to block the movement of such fluids. Such contacting relationships can result in wearing and eventual failure of the sealing system. In addition, such contacting relationships may result in frictional forces that consume energy. The contacting relationship generally results in wear particles or debris that can harm other functions in the sealed device. Sealing devices and methods currently in use may have other limitations and drawbacks.

DISCLOSURE OF INVENTION

It is an object of an exemplary form of the present invention to employ acoustic technology to generate pressure waves for use to control, mitigate, or prevent net leakage from a first area to a second area.

It is a further object of an exemplary form of the present invention to provide an acoustic seal device that can employ acoustic wave principles to generate a pressure barrier to prevent/control fluid leakage from a first area to a second area.

It is a further object of an exemplary form of the present invention to provide an acoustic seal device capable of blocking flow between a high-pressure and a low-pressure cavity through the use of acoustic waves.

It is a further object of an exemplary form of the present invention to provide an acoustic seal device employing "resonant-macrosonic-synthesis" (RMS).

It is a further object of an exemplary form of the present invention to provide noncontact sealing.

Further objects of exemplary forms of the present invention will be made apparent in the following Best Mode for Carrying Out Invention and the appended claims.

The foregoing objects can be accomplished in exemplary forms of the present invention by a noncontact seal apparatus. The apparatus can comprise an acoustic seal device capable of being arranged to produce a sealing pressure barrier condition. A resonant-macrosonic-synthesis (RMS) resonator can be used to create acoustic pressure waveforms to prevent fluid leakage from a high pressure area to a lower pressure area. A portion of the high pressure area can be external to the resonator. An oscillating driver can be coupled with the resonator. The driver can be capable of driving the resonator at a frequency in the range of 500–4500 Hz and at an amplitude in the range of 0.0001–0.10 inches. The resonator can be driven with an oscillation that causes higher harmonics of the pressure waveform to be phase-shifted from a fundamental frequency to achieve a RMS pressure multiplying effect. The resonator can include a chamber housing having a generally conical shape with an open end. The open end can be located adjacent the produced pressure barrier condition. The high and low pressure areas can be in contacting relation with a structure, and the resonator can be in noncontacting relation with the structure during sealing.

BEST MODE FOR CARRYING OUT INVENTION

The sealing of rotating, sliding, or stationary interfaces in certain systems, such as aerospace systems, may become very challenging in certain applications due to high pressure, high speed interface velocities, need for long or infinite life, and unusually shaped interfaces. Exemplary forms of the present invention can employ acoustic technology to generate large pressure waves to control, mitigate, or prevent the net leakage from a first area to a second area. The first area may include a high pressure cavity or zone and the second area may include a relatively lower pressure cavity or zone. Thus, exemplary forms of the invention may act as an acoustic seal that is capable of blocking flow between a high-pressure and a low-pressure cavity through the use of acoustic waves that effectively control net flow. The flow being controlled may comprise a fluid having a gas, liquid, and/or solid. For example, the flow may include a particulate. Of course the flow may include any flowable combination of a gas, liquid, and solid.

Acoustic seals of embodiments of the present invention may employ "resonant-macrosonic-synthesis" (RMS). U.S. Pat. No. 6,230,420 titled "RMS Process Tool"; U.S. Pat. No. 6,163,077 titled "RMS Energy Conversion"; and U.S. Pat. No. 5,515,684 titled "Resonant Macrosonic Synthesis" relate to and teach RMS technology. These patents and their contents are hereby incorporated by reference as if fully rewritten herein.

In some embodiments an acoustic sealing device may use specially shaped resonating cavities that are oscillated at high frequencies to produce high-amplitude standing pressure waves. The resonating cavities may be selected from several shapes, including cone, horn-cone, half cosine, amongst others, to successfully produce the RMS effect.

The acoustic device may be arranged so that pressure waves in a resonator act to counteract the net flow of gas from a high-pressure side to a low-pressure side of the resonator. High pressures may be created using the device of the invention, including pressures up to and beyond 100 psi. Many current sealing devices require pressure ratios of approximately 4:1 to 7:1. In the exemplary embodiment the pressure at a high-pressure end of a resonator may be raised approximately 4–10 times or more higher than the pressure at the low-pressure end of the resonator. Thus, the pressure ratios may meet the demands of many sealing applications. Hence, embodiments of the present invention have wide application.

Although a particular embodiment of the invention is described herein as directed to sealing, including sealing fluid media, it should be understood that the present invention may be applicable to many other embodiments that could include acoustic pressurization. The exemplary sealing device may be used for any application requiring a control/reduction/elimination of flow from a first pressure area to a second pressure area. The device is able to separate fluid by producing a pressure barrier. It should be understood that the separation may include separation of the same fluid type or separation of different fluid types.

Candidate sealing locations for embodiments of the invention are numerous and may involve various devices. For example, the acoustic sealing may be used with shafts, gas turbine engines, gas or steam turbine power generation engines, compressors (including refrigerant compressors), and pumps. Embodiments may also include forming a seal for computer disk-drives where preventing particles from reaching the disk and read-write head is paramount for long term operation without data loss. In addition, embodiments may include forming a vacuum-feed through-seal. Devices such as these may be required in the electronic fabrication and processing fields. In an exemplary form of the present invention, the pumping action can serve both as a seal and to lower the pressure in a chamber to be evacuated. In another embodiment the acoustic seal can be used to prevent leakage of gases and/or liquids to meet stringent environmental emissions standards. Embodiments may also be used with Micro-Electro-Mechanical-Systems (MEMS) for sealing microchip on-board coolant media. Some embodiments may also use the fluid media as the sealing element to prevent contamination of high purity products such as medical, food, or nuclear materials, and prevent contaminating leakage into safe or clean rooms.

Alternative embodiments may include panel-to-panel seals for blocking fluid flow through structural interfaces or gaps where adjoining structures are of unusual shape or have non-uniform surface characteristics which prevent the use of traditional seal structures. Other embodiments may include acoustic enclosures where it is desired to block certain harmonics from leaving an enclosure. Further embodiments may be used in combustion isolation applications where an extremely high temperature combustion process must be contained within a certain confined space, wherein the confinement is performed with acoustic waves instead of by a contacting structure. Other embodiments may include using the principles of the invention to move structures, such as the movement of members in an energy generation or other system. Also, the ability to generate movement, if taken on a larger scale, may permit the movement of devices or vehicles. Although embodiments of the invention may be referenced herein as a sealing device, it should be understood that it is not limited to requiring actual sealing but that it may also broadly encompass embodiments relating to separation and/or movement in general. Thus, it may also be viewed as a pressure separator or pressure controller, and also a pressure-based actuator. That is, embodiments of the invention may be useful in many applications where applied to achieve a desired result.

An exemplary acoustic seal also permits noncontacting or non-wearing operation. With an exemplary sealing device, the sealing resonator (or similar structure capable of inducing acoustic waveforms) does not physically contact an adjacent surface of a structure which is to be sealed. Thus, the acoustic sealing device may be used with high speed rotating shafts to eliminate wear and frictional heating. Furthermore, because sealing may be accomplished without contact, the device may be used with structural applications where the adjacent surface is uneven or has other unusual surface features making it difficult if not impossible to seal with conventional structural seals. By employing such non-contact sealing, clearances between adjacent sealed elements can be made relatively large thereby minimizing the chance for damage during installation or operation. Furthermore, noncontact sealing offers the potential of relatively infinite life, thereby decreasing life-cycle costs.

Some embodiments of the sealing device may use a specially shaped anharmonic acoustic resonator coupled with an oscillating driver, such as a linear motor, piezoceramic driver, or ultrasonic horn or transducer, that drives the resonator chamber at high frequencies (for example, approximately 500–4500 Hz) but at small amplitudes (for example, in the approximate range of 0.000–0.10 in).

In an exemplary embodiment the resonator's unique shape and specially designed end cap(s) or end portion(s) enable the impartation of necessary energy into a fluid to create the necessary acoustic waveforms that repel or minimize the net flow of fluid (e.g., a gas) from a high-pressure cavity. The specially shaped resonator causes the higher harmonics of the pressure waveform to be phase-shifted from a fundamental frequency component of the waveform to achieve an RMS pressure multiplying effect. The acoustic sealing device is able to synthesize desired wave forms over a wide range of acoustic pressure amplitudes, and create resonator boundary conditions needed to control both harmonic phase and amplitude. A feedback control may be used to ensure that a proper phase difference is attained to control the sealing pressure boundary condition. A computer with a control program in conjunction with corresponding instrumentation may be used to measure values of the dynamic pressure in the resonator and the resonator acceleration to provide feedback control. The linear motor drive frequency may be adjusted so that the phase between pressure and acceleration matches a target value. The target phase may be other than 90 degrees. Because the entire resonator may move in response to both the drive force and to the acoustic reaction forces, the drive phase for maximum pressure amplitude may be dependent on the fluid mass in the resonator cavity.

The exemplary acoustic seal is capable of generating a high acoustic pressure barrier to prevent or minimize fluid leakage from a high-pressure cavity to a low-pressure cavity. An end cap is operative to assist in closing a pressure end of the acoustic seal. The resonator chamber's cross-sectional area may be specified as a function of axial position to avoid turbulence due to high acoustic particle velocities and in order to allow high relative-amplitude harmonics. The resonator, which may include plural combined or coupled resonators, may be arranged to provide acoustic pressure amplitudes many times higher than the medium's ambient pressures. Thus, flow between pressure cavities may be virtually eliminated because the fluid in the high-pressure cavity sees only a high-pressure boundary condition that removes a driving potential for flow. During noncontact operation, the sealing may be accomplished by the sealed fluid itself raised to pressures at least equal to the pressure to be sealed. Thus, the present invention permits noncontact acoustic sealing which enables long-life operation with low leakage.

Acoustic waves generated in the resonator can form standing waves. Although these waves may be standing, they do not necessarily remain stationary in one axial location. The linear motor control strategies that may be used in the control of the seal may be optimized along two or more paths. Firstly, the axial movement of the standing waves may be kept to a minimum so that net flow through the seal is minimized. Secondly, in cases where it is warranted, acoustic waves may be created such that there are primary and back-up waves of pressure levels at least as high as the sealed pressure media in order to prevent leakage.

Figure 1:
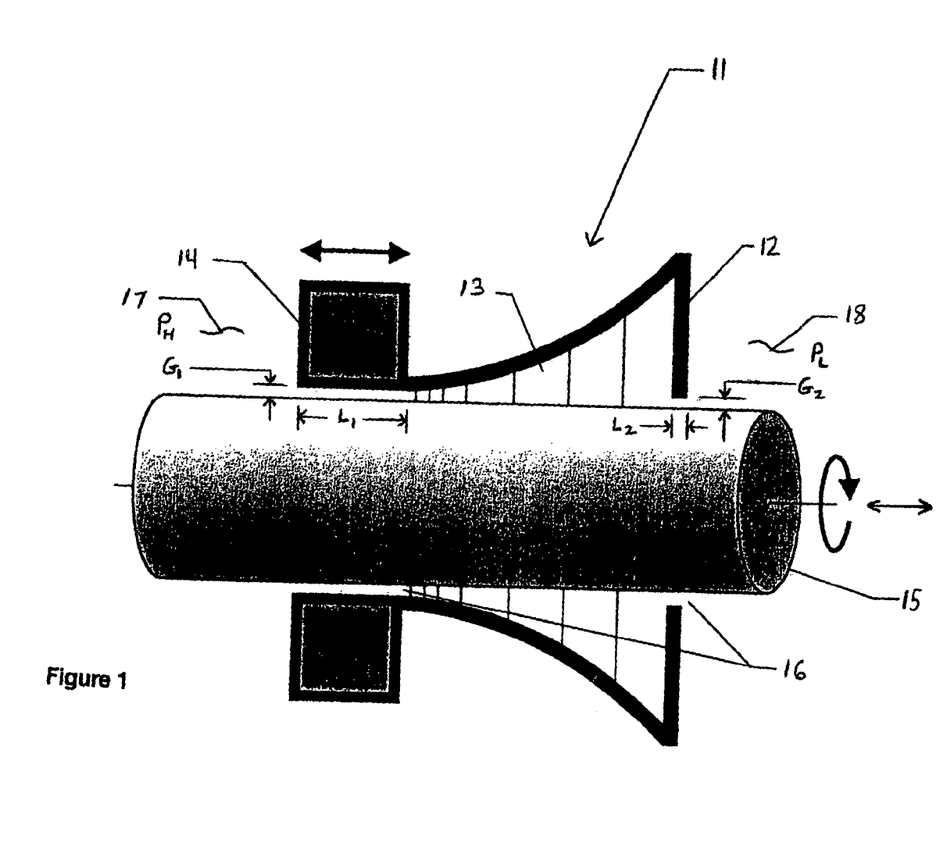
FIG. 1 shows an acoustic seal arrangement.

FIG. 1 shows an exemplary acoustic seal arrangement. The arrangement includes an acoustic noncontact sealing device. The sealing device includes a shaped acoustic anharmonic resonator 11 which has a housing cap or cover plate 12 forming the resonator chamber 13. An oscillating driver 14, such as a linear motor, is coupled to the resonator to drive the resonator chamber at high frequencies but at small amplitudes. The frequencies are generally 500–4500 Hz, and the amplitudes are generally 0.0001–0.10 inches. Of course, other types of drivers capable of generating frequencies and amplitudes generally within these ranges may be used.

It should be understood that the fluid within a resonator may be driven separately. That is, an acoustic driver (e.g., electroacoustic device or speaker) can be used to drive fluid within a resonator without driving the resonator. For example, the cap 12 may include or correspond to a fluid-driving acoustic driver. In exemplary forms of the invention an acoustic seal arrangement may include a resonator driver and/or a fluid driver. For example, the arrangement of FIG. 1 may use a resonator driver 14 or a fluid driver 12 or a combination thereof.

The acoustic sealing device is shown in a noncontact position about an inner or central member or structure 15, such as a shaft. The shaft can be operative to rotate and/or axially move (e.g., oscillate). During sealing operation, annular gaps or spaces 16 remain between the sealing device and the shaft. A fluid, such as a gas, may surround the shaft 15. The acoustic sealing device produces a sealing boundary pressure condition to maintain separation of a high pressure ($P_H$) fluid (e.g., gas) side 17 and a low pressure ($P_L$) fluid (e.g., gas) side 18. The resonator 11 (i.e., outer member) can surround a portion of the shaft 15 (i.e., central member).

The resonator 11 is shown having a longitudinal axis, a first (high pressure) end, and a second (low pressure) end. These ends are each shown having an opening adjacent the resonator axis. Thus, the chamber is open to the external environment, i.e., the environment external or outside of the inner chamber 13. At least a portion of the high pressure area 17 is external to the resonator. Furthermore, the acoustic device may be arranged so that the high pressure area 17 is maintained entirely external to the resonator. The low pressure area 18 may be located external, internal, or have only a portion external to the resonator. It should be understood that the resonator housing may have only one open end, and that the open end may be adjacent the high pressure area. Furthermore, it should be understood that the low pressure area may have relatively zero pressure, such as in a vacuum or in near-vacuum conditions such as exist in outer space.

It should be understood that a resonator in exemplary forms of the invention may be oscillated with or without rotation thereof.

In an exemplary form of the present invention, the acoustic seal may be constructed as described hereinafter. The resonator may be of conical shape or half-cosine shape whose geometry is described by the mathematical equations shown in Table 1 relating internal radius "r" to axial position "x". In the Table, "cos" represents the cosine function.

TABLE 1

| Resonator Shape | Resonator Internal Radius (r) as a function of axial length (x) |
| --- | --- |
| Cone 1 | $r(x) = 0.22 + 0.268\ x$ (inches) |
| Cone 2 | $r(x) = 0.221 + 0.2678\ x$ (inches) |
| Half Cosine | $r(x) = 0.197 + 0.748\ (1 - \cos(\pi\ x/7.874))$ (inches) |

In FIG. 1 a central opening axially extends through the resonator along the resonator axis from the first end opening to the second end opening. The acoustic device is able to surround a shaft 15 extending in the central opening. Thus, the acoustic device is capable of providing a radially extending annular seal at a position along the shaft. Therefore, the device can effectively seal a high pressure zone from a lower pressure zone along a surface of a shaft.

In FIG. 1, annular openings are configured to minimize escape of fluid pressure. Appropriate dimensions can be chosen for both the gaps (e.g., $G_1$ and $G_2$) and lengths (e.g., $L_1$ and $L_2$) of the annular openings to maximize fluid sealing ability while still preventing contact with the shaft 15. In certain embodiments these gaps and lengths can be chosen to exhibit frequency filtering properties. Filtering approaches may be selected from the low-pass, high-pass, or band-stops (e.g., notch) variety, as dictated by the application.

The acoustic resonator is able to impart the necessary energy into the fluid of the high acoustic pressure barrier to create the necessary acoustic waveform repelling the flow of fluid from the high pressure cavity side. Resonator designs are chosen that cause the higher harmonics of the pressure wave to be phase-shifted from the fundamental frequency component of the waveform of the pressure wave to achieve the RMS pressure multiplying effect. A controllable or adjustable linear motor driver may drive the resonator at the appropriate frequency and phase. The drive system can be selected based on its ability to produce high acceleration levels at the appropriate frequency. For example, a drive system may include an electromagnetic shaker capable of achieving high accelerations (e.g., ≧50 g's, where g=acceleration of gravity) at frequencies in the range of 500–4500 Hz. A computer directed feedback control may be used to ensure that the proper phase difference is attained. The linear motor drive frequency may be quickly adjusted, for example in real time, so that the phase between the dynamic pressure and acceleration matches a target value. The target value may be dependent on a gas mass in the resonator chamber. High response dynamic pressure and accelerometer sensors can measure resonator internal pressure and acceleration levels. The acoustic seal may be used to seal the flow of virtually any fluid.

Figure 2:
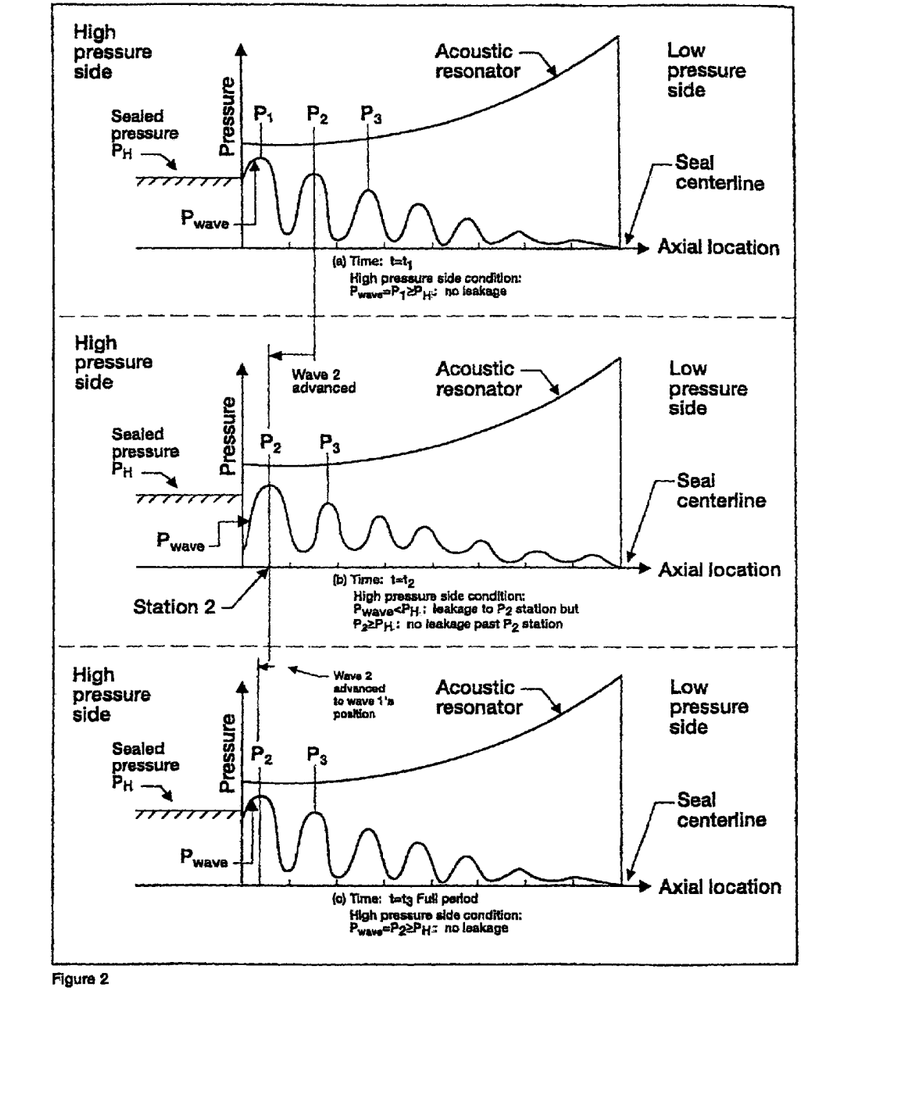
FIG. 2 shows the function of pressure waves over a time period to prevent net leakage through a seal.

In the acoustic seal, both static pressures and dynamic pressures can occur. Both of these pressurizations can be utilized to form an effective pressure barrier to flow. FIG. 2 shows how, in an exemplary embodiment, the dynamic primary ($P_1$) and back-up ($P_2$) pressure waves function to prevent net leakage from a high-pressure side to a low-pressure side of the seal. The Figure shows the time sequence over one full period and the primary ($P_1$) and back-up ($P_2$) pressure wave roles in preventing net leakage through the seal. In FIG. 2, a wave train is depicted that steadily moves from a first side (shown as the low-pressure side) to a second side (shown as the high-pressure side) of an acoustic resonator. The uppermost description in FIG. 2 shows the wave train at time $t=t_1$. Since the wave pressure ($P_{wave}$) at the second side equals $P_1$, which is greater than or equal to the sealed pressure ($P_H$), no leakage occurs.

The intermediate description in FIG. 2 shows the wave train at time $t=t_2$. Here, the wave pressure ($P_{wave}$) is less than the seal pressure ($P_H$) so leakage can occur to an axial station ("Station 2"). However, at this station there is a pressure $P_2$ that is again equal to or greater than the sealed pressure $P_H$ so leakage is blocked.

The lowermost description in FIG. 2 depicts the wave at time $t=t_3$ which corresponds to a full period. At this time the pressure at the left side ($P_{wave}$) is equal to $P_2$, which has increased in magnitude to that of former $P_1$. Over the full period, $P_2$ now becomes the primary wave and $P_3$ becomes the back-up wave. Since $P_2$ is greater than or equal to $P_H$, there is no net leakage through the seal. For the next period the above illustrated process repeats preventing net leakage through the seal.

In summary, the controller/resonator is designed as a system to ensure that at least one of the primary or back-up waves always remain at a high enough level to resist the sealed pressure. The present invention also permits pressure sensing of the sealed cavity pressure to optimize the feedback control process. A computer control system can be used to control the frequency, phase, and amplitude of the oscillating driver to maintain operation of the sealing system. Dynamic pressure and resonator acceleration may be measured with fast-reacting piezo-crystal based sensors. The oscillating driver can drive the resonator at a frequency adjusted so that the phase between the pressure and acceleration matches a target value. In an exemplary form of the present invention, the ability to alter the phase of the harmonics is used to dramatically extend the shock-limit to permit high pressure amplitudes. The oscillating driver can import significant power to the system that in turn can heat the gas in the resonator and shift the associated resonance frequency. The computer controller can employ a resonance-locking scheme in order to keep the drive frequency locked onto the acoustic resonance, and thus maximize the RMS effect. In an exemplary form of the present invention, a computer program can be implemented, for example, in Labview® by National Instruments Co.

A resonator may be of various shapes (e.g., geometries or dimensions or configurations), including a cone shape, a horn with a cone coupled thereto, or a "half-cosine" shape. Resonator material may be chosen to meet weight, stiffness, strength, and fatigue strength criteria. Examples of candidate materials may include high strength aluminum (e.g., 7075-T6), aluminum-lithium, magnesium, nickel based superalloys, titanium, beryllium, engineered ceramics (e.g., $Si_3N_4$, SiC, $Al_2O_5$), ceramic matrix composites, and/or carbon or glass reinforced polymeric matrix composites.

Figure 3:
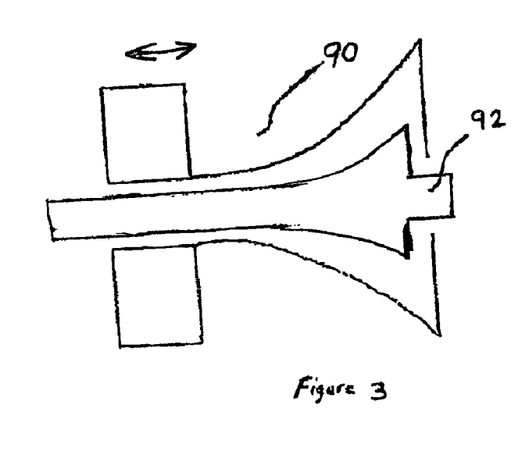
FIG. 3 shows a seal arrangement having a shaped shaft.
Figure 4:
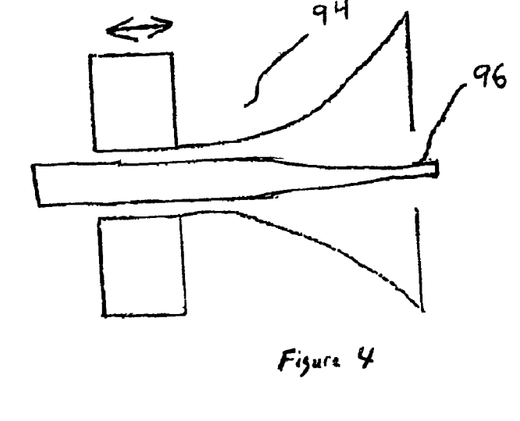
FIG. 4 shows a seal arrangement having an alternative shaped shaft.

Other arrangements may include a combination of both a shaped resonator and a shaped shaft. FIG. 3 shows an arrangement having a resonator 90 and a shaped shaft 92. The shaft can have a cone-shape or horn-shape section adjacent an end thereof, such as a low pressure end. Thus, a shaft section adjacent the low pressure end can have increasing diameter in an axial direction toward the low pressure end. FIG. 4 shows an alternative arrangement of a resonator 94 and a shaped shaft 96. The shaft can have an inwardly tapered section along the shaft axis adjacent an end thereof, such as a low pressure end. Thus, a shaft section adjacent the low pressure end can have reducing diameter in an axial direction toward the low pressure end. Again, the arrow in each of FIGS. 3 and 4 depicts excitation of the resonator. However, it should be understood that in other embodiments the shaft may be excited or both the resonator and the shaft may be excited, e.g., simultaneously or intermittently. Still other arrangements may include a combination of both a shaped resonator and a shaped shaft. Still further arrangements may include a resonator that can rotate.

Figure 5:
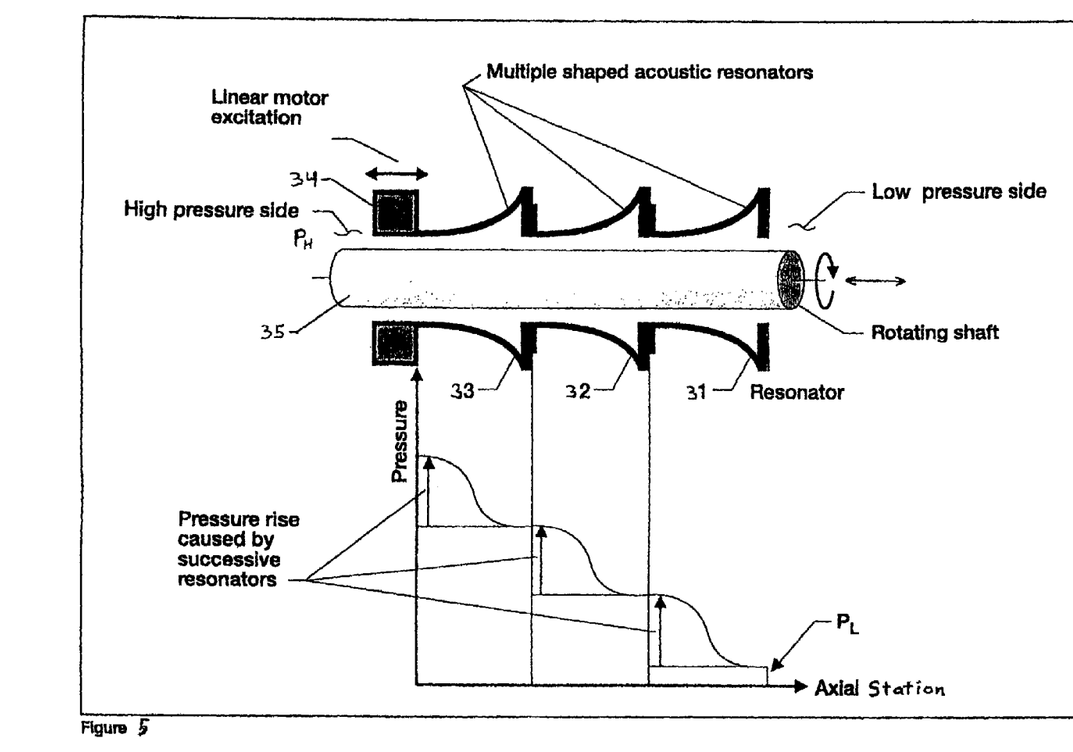
FIG. 5 shows an acoustic seal arrangement having multiple resonators and a pressure amplification effect.

The upper description in FIG. 5 shows an acoustic seal arrangement having a plurality of resonators 31, 32, 33 connected together. A linear drive motor 34 and a central member or structure 35 are also shown. The central member 35 may comprise a shaft operative to rotate and/or axially move (e.g., oscillate). In situations where higher pressures or higher pressure ratios are required, a plurality of resonators can be connected together to raise the total pressure ratio across the seal. The pressure rise of resonator 31 is geometrically increased by subsequent resonators 32, 33 allowing the seal to seal at higher pressure ratios. The lower description in FIG. 5 conceptually illustrates a pressure amplification effect relating to the multiple resonators. The lower description in FIG. 5 also shows the pressure profile versus axial station. The attached resonators may be removably connected, integral, or one-piece.

Figure 6:
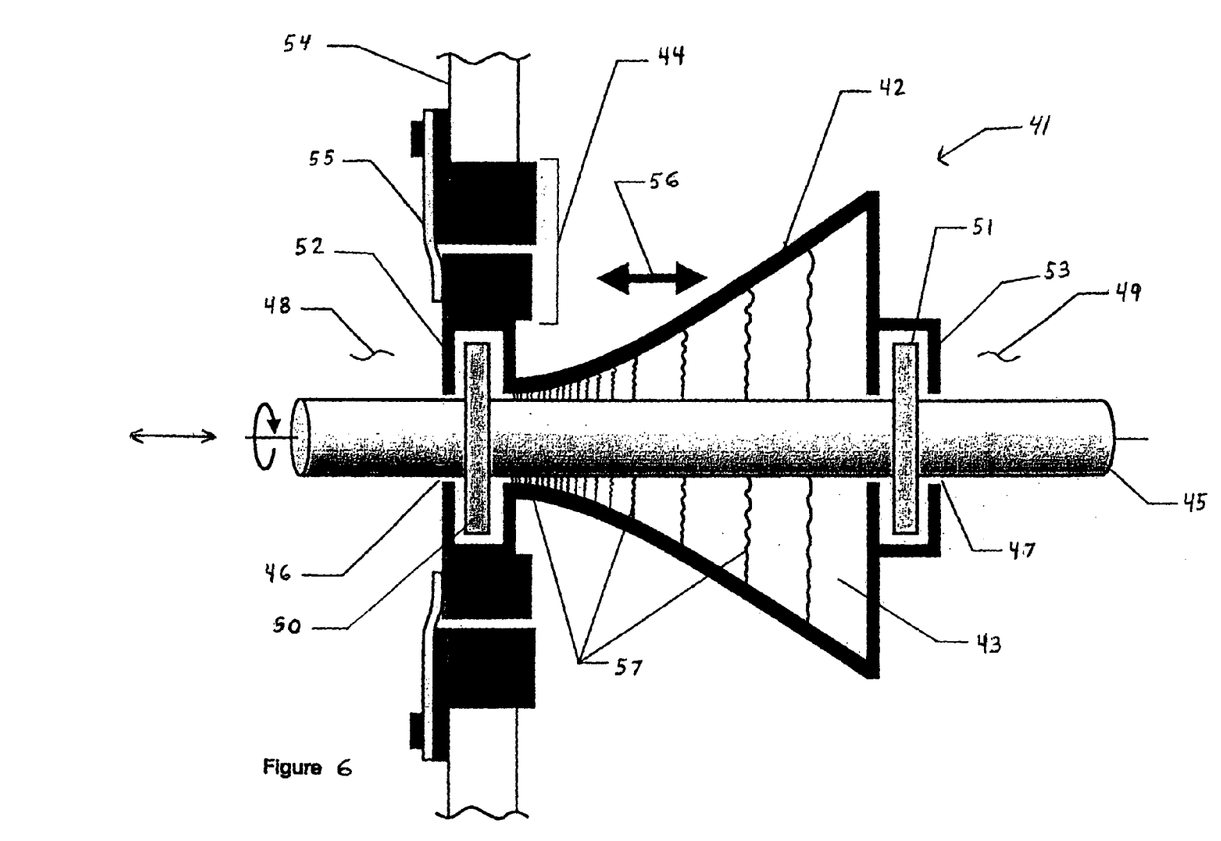
FIG. 6 shows an acoustic seal arrangement having disks implemented on a shaft to aid in increasing sealing effectiveness.

FIG. 6 shows an acoustic seal arrangement having a shaped acoustic resonator 41, a resonator housing 42 forming an inner resonator chamber 43, an oscillating driver 44, a structural central member 45 (e.g., a rotatable and/or axially translatable cylindrical shaft), annular gaps 46 and 47, a relatively high pressure area 48, and a relatively lower pressure area 49. FIG. 6 also shows that one or more radial extending members 50, 51 (e.g., disks) may be attached to the structural component 45 to minimize the escape of pressure. The escaping waves can be reflected back toward the chamber by the disks. The operatively attached disks 50, 51 may be removably connected thereto, integral therewith, or be one-piece with the shaft 45. The disks, or other reflecting members, may be arranged to extend substantially perpendicular from the longitudinal axis of the shaft. Of course, many other sized and/or shaped elements may serve to reflect the waves instead of the shown disks. Thus, any element that is capable of extending from the structural component (and has a reflecting surface) to reflect the waves, without interfering with the operation of the sealing device, may be used. It should be understood that if the structural component is not cylindrical then the reflecting element would not need to necessarily be radial.

The radial extending members 50, 51 (e.g., disks) may be located in one or more close-tolerance disk housings 52 and 53 (which may oscillate with the resonator) to prevent the planar acoustic waves from escaping via gaps. The integrated disk/housing arrangement can prevent direct line-of-sight losses of acoustic waves out of the resonator chamber. Thus, the acoustic seal device may be arranged with extending members and corresponding housings to help minimize seal leakage and noise emissions.

As shown in FIG. 6, the oscillating driver 44 may be a linear motor that is integrated with the acoustic resonator 41 and a support structure 54. The support structure 54 may be movable or stationary. As previously discussed, the linear motor may be used to cause the axial vibration of the resonator resulting in the high-pressure waves required for sealing purposes. FIG. 6 further shows that an additional or secondary sealing structure 55, such as a bladder or diaphragm seal, may be used to prevent parasitic or secondary leakage from the acoustic resonator. Axial vibration 56 and acoustic compression waves 57 are also represented. Additional secondary sealing structures may be implemented.

FIGS. 7–12 show different utilizations and arrangements of an exemplary acoustic device of the present invention. The acoustic devices can include specially-shaped resonator elements to block or mitigate flow from a high pressure region ($P_H$) to a low pressure region ($P_L$). It should be understood that the acoustic devices shown can be arranged either radially surrounded by a member to be sealed, radially surrounding a member to be sealed, or adjacent a side of a member to be sealed.

Figure 7:
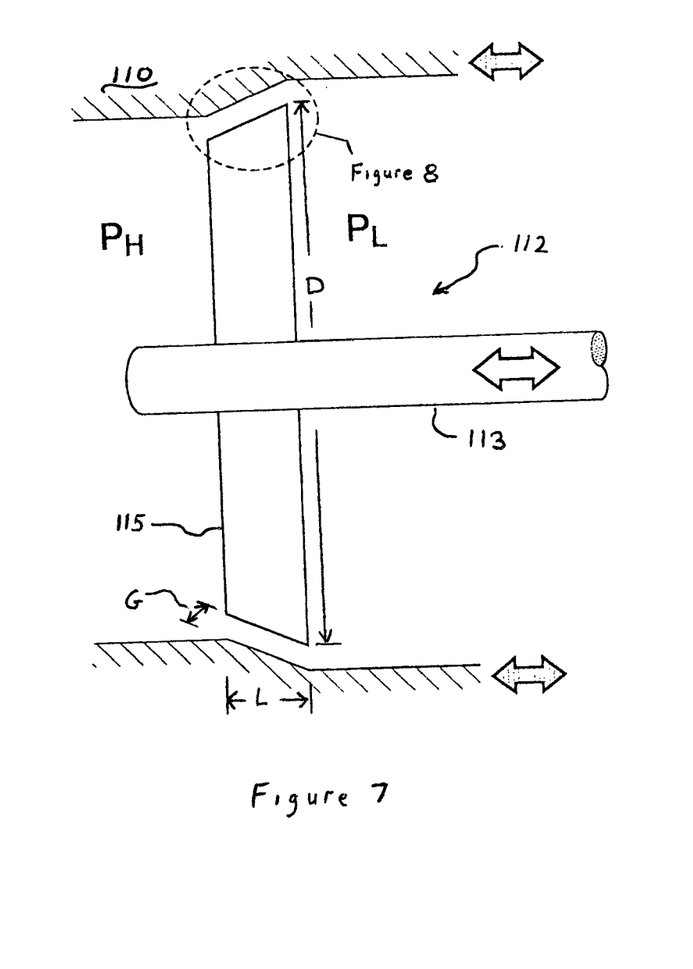
FIG. 7 shows an arrangement providing acoustic sealing between a central member and an outer member.

FIG. 7 shows a seal arrangement having an outer member 110 and a central member 112. The acoustic device is capable of providing a radially extending annular seal between the outer member and the central member. The outer member 110 and the central member 112 can have a cone shape. The central member diameter (D) can be large relative to the length (L) or gap (G) of the sealing region. The central member 112 can comprise a shaft 113 and a flange 115. The flange may comprise a disk having an outer surface shape which corresponds to the inner surface shape of the outer member. For example, these adjacent surfaces may be cone shaped. These adjacent surfaces can also bound the gap. The acoustic device is capable of providing sealing to the gap, which may be annular. The arrows in FIG. 7 depict direction of potential oscillation. The outer member 110, the central member 112, or both may be excited. For example, the outer member and the central member may be simultaneously oscillated.

Figure 8:
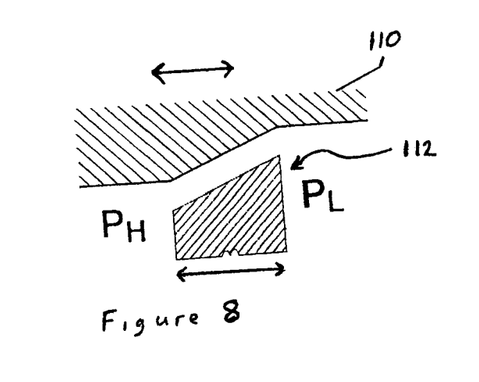
FIG. 8 shows the cone shape relationship of the central and outer members of FIG. 7.
Figure 9:
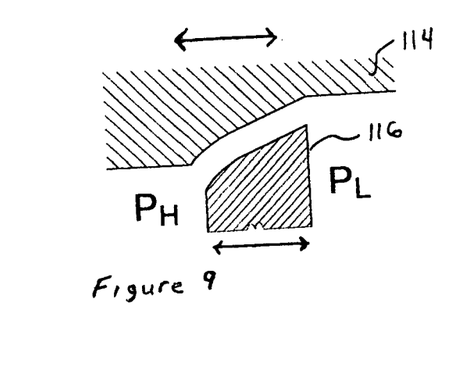
FIG. 9 shows a horn-cone shape relationship of central and outer members.

FIG. 8 shows a more detailed view of the outer member 110 adjacent the central member 112. FIG. 9 shows an alternative arrangement of an outer member 114 adjacent a central member 116. The outer member 114 and central member 116 each have a portion with a corresponding horn-cone shape. Either outer member 114 or central member 116 (or both) may be oscillated as depicted by the arrows.

Figure 10:
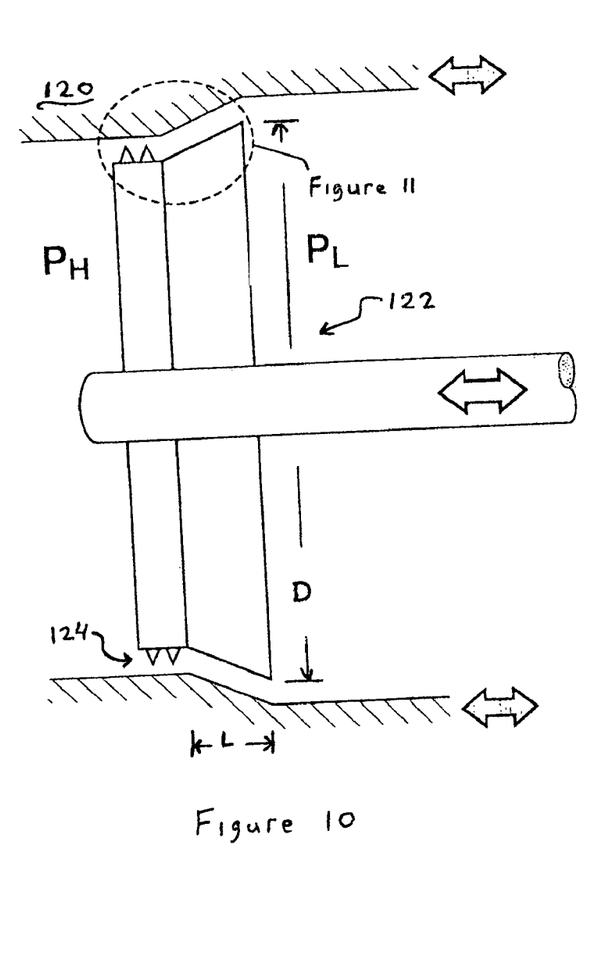
FIG. 10 shows an arrangement having labyrinth teeth to augment acoustic sealing between a central member and an outer member.
Figure 11:
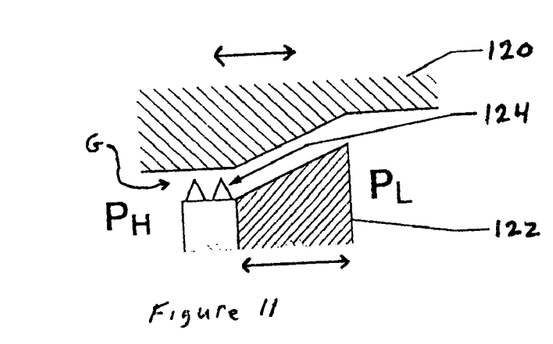
FIG. 11 shows the cone shape relationship of the central and outer members of FIG. 10.
Figure 12:
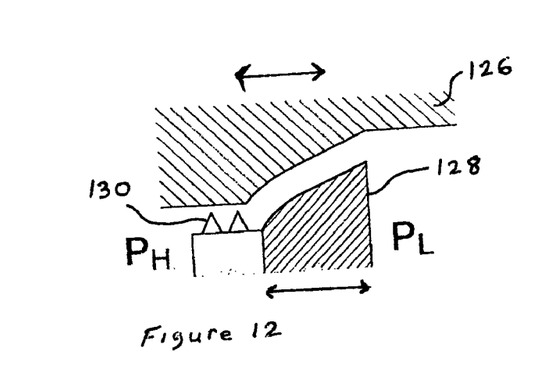
FIG. 12 shows a horn-cone shape relationship of central and outer members, including labyrinth teeth.

FIG. 10 shows an arrangement having an outer member 120 and a central member 122. The outer member 120 and the central member 122 can have a cone shape. The central member diameter (D) can be large relative to the length (L) or gap (G) of the sealing region. The central member may have a plurality of labyrinth teeth 124 on the high pressure side of the seal region to further increase the overall sealing effectiveness. It should be understood that the outer member may also have a plurality of labyrinth teeth on the high pressure side of the seal region. The arrows in FIG. 10 depict oscillation. The outer member, the central member, or both may be excited via oscillation. For example, the outer member and the central member may be simultaneously oscillated. FIG. 11 shows a more detailed view of the outer member 120 adjacent the central member 122, and the labyrinth teeth 124. FIG. 12 shows an alternative arrangement of an outer member 126 and a central member 128. The outer member 126 and central member 128 each have a portion with a horn-cone shape. The central member may have a plurality of labyrinth teeth 130 on the high pressure side of the seal region to further increase the overall sealing effectiveness. The outer member 126 may also have labyrinth teeth. Either the outer member 126 or the central member 128 (or both) may be oscillated as depicted by the arrows.

In FIGS. 7–12, the central or inner member may comprise an acoustic seal device resonator. The outer member may comprise a structure having an opening or cavity therein to be sealed. The outer member may also comprise plural separate structures, with the acoustic seal device providing sealing therebetween. The central member can include a shaft and a flange. The shaft can include an axis. The flange can extend in a radial direction relative to the axis. The flange can be attached to the shaft. The flange can comprise at least one disk attached to the shaft. The disk may be annular. The disk can include an arrangement of labyrinth teeth attached thereto or integral therewith. The outer and central members can be relatively arranged so that the outer member substantially surrounds at least a portion of the central member. The outer shape of the central member (e.g. disk shape) may correspond to the shape (e.g., non symmetrical or irregular) of the opening in the outer member. The arrangement of the outer and inner members permits acoustic sealing of the opening. During interface sealing, the high and low pressure areas can be in contacting relation with the structure surface while the resonator is in noncontacting relation with the structure surface. In exemplary forms of the invention either the outer member or central member or both may be rotated. For example, an oscillating member may or may not include rotation thereof, and a non-oscillating member may or may not include rotation thereof.

The final shape (cylindrical, rectangular, etc.) and dimensions of the sealing device depend on the desired seal integrity and the shape (cylindrical, rectangular, etc.) of the member(s) to be sealed. An acoustic sealing device of the present invention is configurable to meet different sealing conditions.

FIGS. 13–20 show different utilizations and arrangements of an exemplary acoustic device of the present invention. The acoustic devices include a resonator. It should be understood that the acoustic devices shown may be arranged either adjacent a side of a member to be sealed (e.g., FIGS. 13–18) or radially surrounding a member (e.g., FIGS. 19–20).

Figure 13:
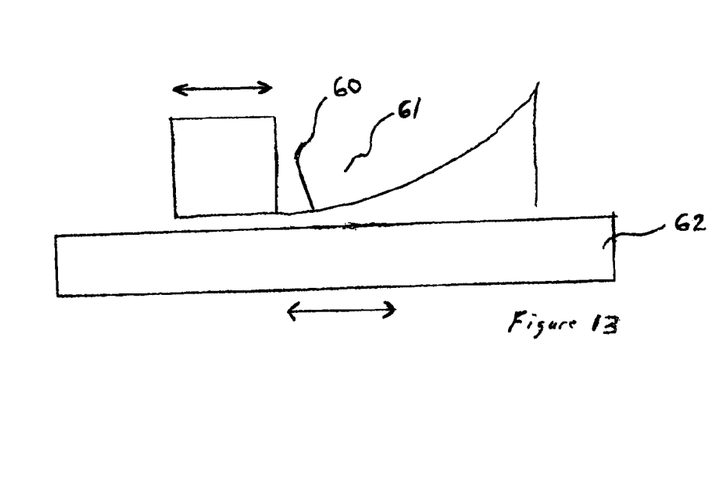
FIG. 13 shows a seal arrangement with an acoustic device adjacent an axially movable member.
Figure 14:
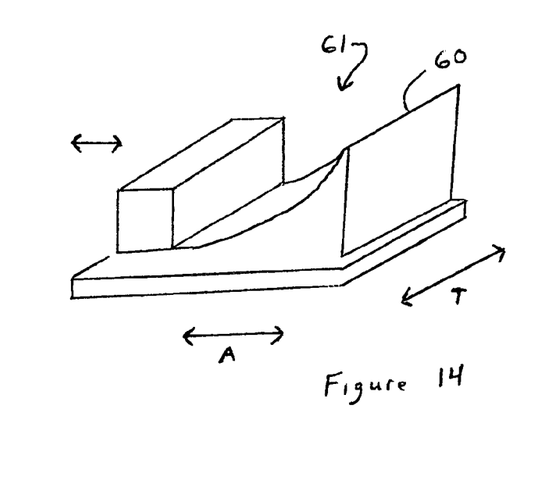
FIG. 14 shows a seal arrangement with an acoustic device adjacent a member moving either axially or transverse or both directions.
Figure 15:
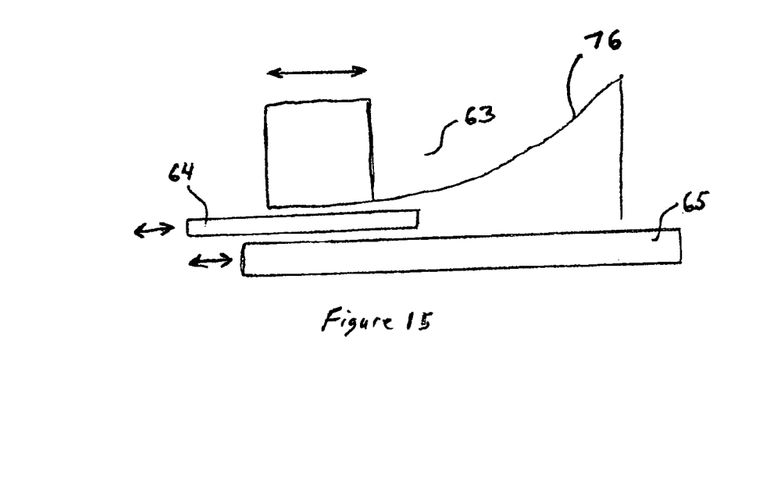
FIG. 15 shows a seal arrangement with an acoustic device adjacent two axially movable members.
Figure 16:
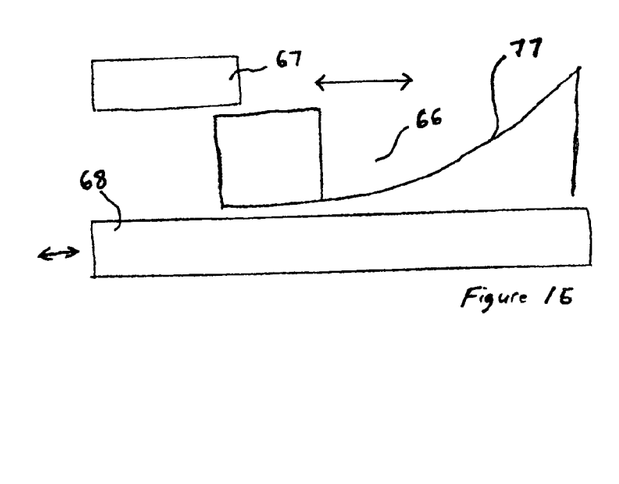
FIG. 16 shows a seal arrangement with an acoustic device adjacent a stationary member and an axially movable member.

FIG. 13 shows a seal arrangement where an acoustic device 61 having a resonator 60 may act as a seal (e.g., slide seal) adjacent a movable member 62. The upper arrow depicts excitation of the resonator. The other arrow depicts axial or transverse movement of the member 62. FIG. 14 shows an angled view of the seal arrangement of FIG. 13, including axial movement direction arrows (A) and transverse movement direction arrows (T). FIG. 15 shows an acoustic device 63 sealing the area adjacent two independent axially movable members 64 and 65. FIG. 16 shows an acoustic device 66 sealing the area adjacent a stationary member 67 and an axially movable member 68. The operation of the acoustic devices of FIGS. 13–16 may include exciting the resonator 60, 76, 77 to have the largest fluid-to-structure coupling to drive fluid to resonance.

Figure 17:
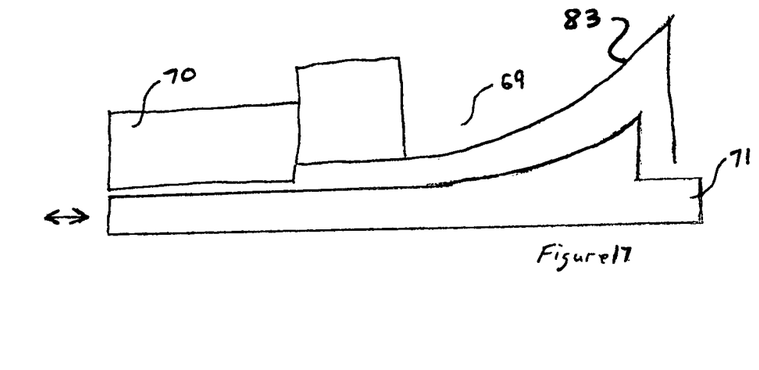
FIG. 17 shows a seal arrangement with an acoustic device adjacent a stationary member and an alternative axially movable member.

FIG. 17 shows an acoustic device 69 sealing the area adjacent a stationary member 70 and an axially movable member 71. An axially movable member may have various shapes or dimensions, such as those shapes previously mentioned, including a conical or partial conical shape. The shape of an axially movable member may correspond to the shape of the resonator. FIG. 17 shows the movable member 71 having an axial section expanding in a radial direction, such as a curved taper. The sealing operation may include driving (e.g., oscillating) the resonator 83. Alternatively, the sealing operation may include holding the resonator 83 stationary and shaking (e.g., oscillating) the movable member 71.

Figure 18:
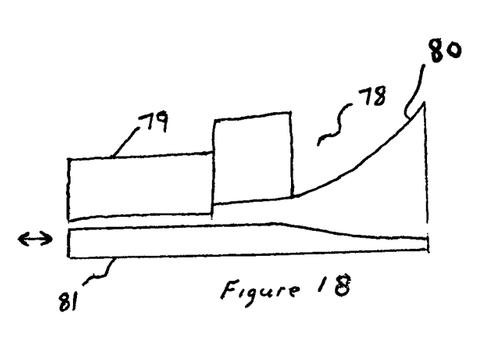
FIG. 18 shows a seal arrangement with an acoustic device adjacent a stationary member and another alternative axially movable member.

FIG. 18 further shows an acoustic device 78 sealing the area adjacent a stationary member 79 and an axially movable member 81. FIG. 18 shows the movable member 81 having an axial section decreasing in a radial direction. Again, the sealing operation may include holding the resonator 80 stationary and shaking the movable member 81. As shown, an axially movable member 71, 81 can be shaped to excite pressure blocking acoustic waves.

It should be understood that in the embodiments of FIGS. 13–18 the fluid within a resonator may be driven separately. That is, an acoustic driver (e.g., electroacoustic device or speaker) can be used to drive fluid within a resonator without driving the resonator. For example, an end cap may be used to include or correspond to a fluid driving acoustic driver. In exemplary forms of the invention an acoustic seal arrangement may include a resonator driver and/or a fluid driver. For example, the arrangements of FIGS. 13–18 may use a resonator driver or a fluid driver or a combination thereof.

Figure 19:
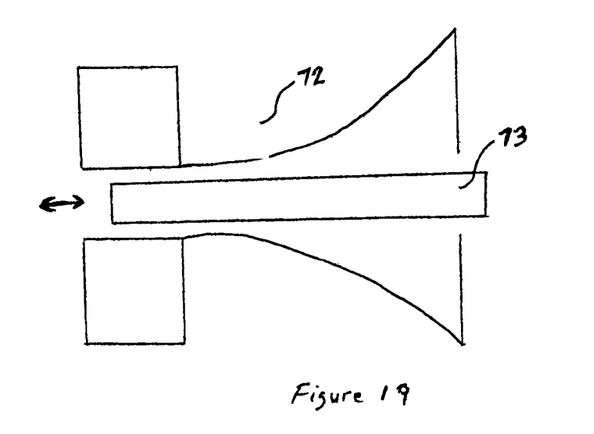
FIG. 19 shows an acoustic device operative to axially transport a movable member.
Figure 20:
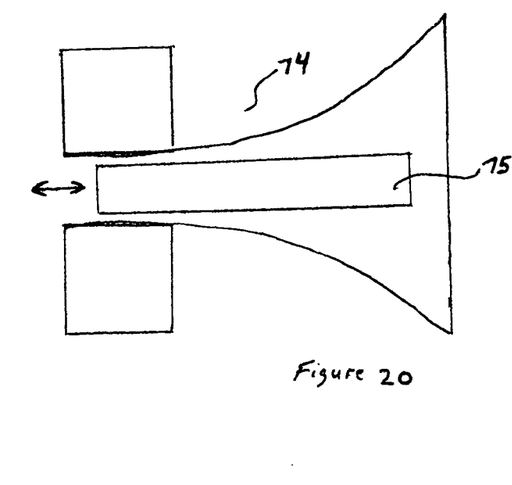
FIG. 20 shows an alternative acoustic device capable of moving a member.

FIG. 19 shows an acoustic device 72 (e.g., including an oscillator resonator) adapted to axially transport a movable member 73, such as a piston. FIG. 20 also shows an acoustic device 74 (e.g., including an oscillator resonator) capable of moving a movable member 75 (e.g., a piston). An acoustic device which is operative to move an object may have a resonator housing with only one open end instead of two open ends. Furthermore, the open end may be adjacent a high pressure area. An acoustic device, in conjunction with pressure zones, may be operated in an on/off manner to repetitively move an object (e.g., a piston) back and forth. The device may also be used to move one or more objects a predetermined distance. Conversely, the acoustic device may be used to slow down or stop a moving object. In exemplary forms of the invention either the acoustic device 72, 74 or the movable member 73, 75 or both may be rotated. For example, an oscillating member in the acoustic device may or may not include rotation thereof without rotation of the entire acoustic device. Thus, an exemplary form of an acoustic device of the present invention, with its generated pressure waves, has wide industrial applicability.

Of course one skilled in the art would recognize alternative capabilities, which are too numerous to mention here, that could be attributed to the availability of low leakage noncontact seals, which are possible with the present invention. The exemplary novel acoustic seal may provide particular usefulness to next generation aircraft and spacecraft propulsion systems. For example, the acoustic seal may enable aircraft engines to save on both specific fuel consumption and direct operating cost. Additionally, employing the exemplary acoustic seal to reduce or eliminate helium purge leakage in an inter-propellant seal on the Space Shuttle Main engines can lead to greater payload increases for future Shuttle derived vehicles.

It is to be understood that embodiments of the present invention are not limited to sealing arrangements, but can be applied with other desired pressure separation or control applications. For example, an acoustic device may be used to control dispensing of a fluid (and/or particulate), such as a hazardous fluid. Also, as previously discussed, embodiments may have utility not only in sealing but also in moving one or more objects (e.g., pistons).

Thus, the acoustic seal of the present invention achieves numerous objectives, eliminates difficulties encountered in the use of prior seals, solves problems, and attains the desired results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the details shown and described. Further, in the following claims any feature that is described as a means for performing a function shall be construed as encompassing any means capable of performing that function and shall not be limited to the particular means shown in the foregoing description or mere equivalents. Also, it is emphasized that the abstract is submitted with the understanding that it will not be used to interpret or limit the scope or meaning of the claims.

Having described the features, discoveries, and principles of the invention, the manner in which it is constructed and operated, and the advantages and useful results attained; the new and useful structures, devices, elements, arrangements, parts, combinations, systems, equipment, operations and relationships are set forth in the appended claims.

I claim:

1. An acoustic seal device comprising:
    an acoustic resonator providing acoustic pressure waveforms to produce a sealing pressure boundary condition separating a higher pressure area from a lower pressure area, wherein the higher pressure area is at a higher pressure relative to the lower pressure area, wherein at least a portion of the higher pressure area is external to the resonator, wherein the resonator includes a resonant-macrosonic-synthesis (RMS) resonator, and wherein the acoustic resonator includes an arrangement of plural resonators, wherein the arrangement is operative to cause a pressure rise from the lower pressure area to the higher pressure area.

2. An acoustic seal device comprising:
    an acoustic resonator providing acoustic pressure waveforms to produce a sealing pressure boundary condition separating a higher pressure area from a lower pressure area, wherein the higher pressure area is at a higher pressure relative to the lower pressure area, wherein at least a portion of the higher pressure area is external to the resonator, wherein the resonator includes a resonant-macrosonic-synthesis (RMS) resonator, and wherein the acoustic resonator includes a plurality of resonators connected together to raise a total pressure ratio from the lower pressure area to the higher pressure area.

3. An acoustic seal device comprising:
an acoustic resonator providing acoustic pressure waveforms to produce a sealing pressure boundary condition separating a higher pressure area from a lower pressure area, wherein the higher pressure area is at a higher pressure relative to the lower pressure area, wherein at least a portion of the higher pressure area is external to the resonator, wherein the resonator includes a resonant-macrosonic-synthesis (RMS) resonator, and further including a structure having a surface, wherein during sealing the higher and lower pressure areas are in contacting relation with the structure surface and the resonator is in noncontacting relation with the structure surface, and wherein the structure includes a central member, wherein the resonator substantially surrounds at least a portion of the central member.

4. The acoustic seal device according to claim 3, wherein the resonator includes at least one opening to the external environment, wherein at least one disk is attached to the central member, wherein the at least one disk minimizes the escape of acoustic waves from at least one opening.

5. The acoustic seal device according to claim 3 wherein the central member includes an axis, wherein the central member is operative to be oscillated in the axial direction.

6. The acoustic seal device according to claim 3 wherein the central member includes an axis, wherein the central member is rotatable about the axis.

7. An acoustic seal device comprising:
an acoustic resonator providing acoustic pressure waveforms to produce a sealing pressure boundary condition separating a higher pressure area from a lower pressure area, wherein the higher pressure area is at a higher pressure relative to the lower pressure area, wherein at least a portion of the higher pressure area is external to the resonator, wherein the resonator includes a resonant-macrosonic-synthesis (RMS) resonator, and further including a computer and instrumentation, wherein the computer is adapted to use instrumentation measured values of dynamic pressure in the resonator and the resonator acceleration to provide feedback control to ensure that a proper phase difference is attained to control the sealing pressure boundary condition.

8. An acoustic seal device comprising:
a resonator operable to oscillate at frequencies and amplitudes to create acoustic waveforms, wherein the waveforms are adapted to generate a sealing pressure barrier blocking fluid flow from a first pressure area to a second pressure area, wherein the first pressure area includes a higher pressure relative to the second pressure area, wherein at least a portion of the first pressure area is external to the resonator, wherein the resonator includes a resonant-macrosonic-synthesis (RMS) resonator, further comprising labyrinth teeth operative to contribute to the sealing pressure barrier.

9. An acoustic seal device comprising:
a resonator operable to oscillate at frequencies and amplitudes to create acoustic waveforms, wherein the waveforms are adapted to generate a sealing pressure barrier blocking fluid flow from a first pressure area to a second pressure area, wherein the first pressure area includes a higher pressure relative to the second pressure area, wherein at least a portion of the first pressure area is external to the resonator, and wherein the resonator includes a resonant-macrosonic-synthesis (RMS) resonator, and wherein the resonator includes a shaft and a flange, wherein the shaft includes an axis, and wherein the flange extends in a radial direction relative to the axis.

10. The acoustic seal device according to claim 9 wherein the flange comprises an annular disk.

11. The acoustic seal device according to claim 9 wherein the shaft comprises a rotatable shaft, and wherein the rotatable shaft is operative to be oscillated in the axial direction.

12. The acoustic seal device according to claim 9 and further including a structure comprising an outer member, wherein the resonator comprises an inner member, wherein the outer member substantially surrounds at least a portion of the inner member, wherein during sealing the first and second pressure areas are in contacting relation with the outer member and the inner member is in noncontacting relation with the outer member.

13. The acoustic seal device according to the claim 12 wherein labyrinth teeth are on at least one of the inner member or outer member, and wherein the labyrinth teeth contribute to the sealing pressure barrier.

14. The acoustic seal device according to claim 12 wherein the structure includes a cavity, wherein at least a portion of the resonator is positioned in the cavity, wherein the waveforms are operative to seal the cavity.

15. An acoustic seal device adapted to seal fluid media, comprising:
a resonant-macrosonic-synthesis (RMS) resonator adapted to create acoustic pressure waveforms to prevent fluid leakage from a relatively high pressure area to a relatively lower pressure area, wherein at least a portion of the high pressure area is external to the resonator,
an oscillating driver, wherein the driver is coupled with the resonator,
wherein the driver is adapted to drive fluid within the resonator at a frequency in the range of 500–4500 Hz and at an amplitude in the range of 0.0001–0.10 inches during sealing, and further including an inner member, wherein at least a portion of the inner member is surrounded by the resonator.

16. The acoustic seal device according to claim 15 wherein during sealing the resonator and/or the inner member is operative to rotate.

* * * * *